United States Patent
Huber et al.

(10) Patent No.: US 10,621,461 B1
(45) Date of Patent: Apr. 14, 2020

(54) GRAPHICAL DISPLAY AND USER-INTERFACE FOR HIGH-SPEED TRIAGE OF POTENTIAL ITEMS OF INTEREST IN IMAGERY

(71) Applicant: HRL Laboratories, LLC, Malibu, CA (US)

(72) Inventors: David J. Huber, Calabasas, CA (US); Deepak Khosla, Camarillo, CA (US); Kevin R. Martin, Oak Park, CA (US); Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 506 days.

(21) Appl. No.: 14/203,256

(22) Filed: Mar. 10, 2014

Related U.S. Application Data

(60) Provisional application No. 61/779,320, filed on Mar. 13, 2013.

(51) Int. Cl.
*G06K 9/00* (2006.01)
*G06K 9/46* (2006.01)
(Continued)

(52) U.S. Cl.
CPC ............ *G06K 9/46* (2013.01); *G06K 9/0063* (2013.01); *G06K 9/00496* (2013.01);
(Continued)

(58) Field of Classification Search
CPC .. G06K 9/00; G06K 9/00201; G06K 9/00362; G06K 9/00496; G06K 9/00624;
(Continued)

(56) References Cited

U.S. PATENT DOCUMENTS

| 4,267,562 | A | * | 5/1981 | Raimondi | ................ | F41G 3/02 |
| | | | | | | 348/144 |
| 5,077,609 | A | * | 12/1991 | Manelphe | ................ | H04N 5/33 |
| | | | | | | 348/115 |

(Continued)

OTHER PUBLICATIONS

Michael T. Eismann, Alan D. Stocker, and Nasser M. Nasrabadi, "Automated Hyperspectral Cueing for Civilian Search and Rescue", IEEE, Proceedings of the IEEE, vol. 97, No. 6, Jun. 2009, pp. 1031-1055.*

(Continued)

*Primary Examiner* — Eric Rush
(74) *Attorney, Agent, or Firm* — Tope-McKay & Associates

(57) ABSTRACT

The present invention relates to a surveillance system and, more particularly, to a graphical display and user interface system that provides high-speed triage of potential items of interest in imagery. The system receives at least one image of a scene from a sensor. The image is pre-processed to identify a plurality of potential objects of interest (OI) in the image. The potential OI are presented to the user as a series of chips on a threat chip display (TCD), where each chip is a region extracted from the image that corresponds to a potential OI. Finally, the system allows the user to designate, via the TCD, any one of the chips as an actual OI.

32 Claims, 5 Drawing Sheets

(51) Int. Cl.
*G06K 9/52* (2006.01)
*H04N 7/18* (2006.01)
*G06K 9/62* (2006.01)
*G06K 9/32* (2006.01)
*G06K 9/03* (2006.01)

(52) U.S. Cl.
CPC ..... *G06K 9/00624* (2013.01); *G06K 9/00637* (2013.01); *G06K 9/00711* (2013.01); *G06K 9/033* (2013.01); *G06K 9/3233* (2013.01); *G06K 9/3241* (2013.01); *G06K 9/52* (2013.01); *G06K 9/623* (2013.01); *G06K 9/6263* (2013.01); *H04N 7/18* (2013.01)

(58) Field of Classification Search
CPC ............. G06K 9/0063; G06K 9/00637; G06K 9/00664; G06K 9/00671; G06K 9/00805; G06K 9/03; G06K 9/033; G06K 9/036; G06K 9/2081; G06K 9/3233; G06K 9/3241; G06K 9/34; G06K 9/6215; G06K 9/623; G06K 9/6253; G06K 9/6254; G06K 9/6262; G06K 9/6263; G06K 9/6292; G06K 15/00; G06K 15/002; G06K 2009/3291; G06K 2009/6213; G06K 2209/09; G06K 2209/21; G06K 9/00711; G06K 9/46; G06K 9/52; G06T 7/004; G06T 7/0079; G06T 11/60; H04N 1/00095; H04N 1/00098; H04N 1/00127; H04N 1/00209; H04N 1/00233; H04N 1/00246; H04N 1/00336; H04N 1/00405; H04N 1/00408; H04N 1/00411; H04N 1/00419; H04N 1/00424; H04N 1/0044; H04N 1/00442; H04N 1/00445; H04N 1/00448; H04N 1/0045; H04N 1/00453; H04N 1/00458; H04N 1/00469; H04N 7/18
USPC ....... 382/100, 103, 159, 173, 181, 224, 282, 382/291, 307, 308, 328
See application file for complete search history.

(56) References Cited

U.S. PATENT DOCUMENTS

| | | | | | |
|---|---|---|---|---|---|
| 5,458,041 | A | * | 10/1995 | Sun | F41G 7/00 244/3.11 |
| 6,072,889 | A | * | 6/2000 | Deaett | G06K 9/3241 382/103 |
| 6,298,143 | B1 | * | 10/2001 | Kikuchi | G06K 9/3241 382/103 |
| 6,578,017 | B1 | * | 6/2003 | Ebersole | G06T 7/00 706/3 |
| 6,903,676 | B1 | * | 6/2005 | Frady | G01S 7/003 342/52 |
| 7,471,827 | B2 | * | 12/2008 | Xie | G06F 16/9577 382/173 |
| 7,773,121 | B1 | * | 8/2010 | Huntsberger | H04N 5/232 348/143 |
| 7,991,195 | B2 | * | 8/2011 | Mathan | G06F 16/583 382/103 |
| 8,026,842 | B2 | * | 9/2011 | Fox | G01S 7/2922 342/52 |
| 8,059,136 | B2 | * | 11/2011 | Mathan | G06K 9/00637 382/224 |
| 8,244,475 | B2 | * | 8/2012 | Aguilar | A61B 5/048 600/544 |
| 8,265,743 | B2 | * | 9/2012 | Aguilar | A61B 3/113 600/544 |
| 8,373,127 | B2 | * | 2/2013 | Ragucci | G01S 19/14 250/346 |
| 2006/0077255 | A1 | * | 4/2006 | Cheng | G06K 9/0063 348/143 |
| 2007/0268364 | A1 | * | 11/2007 | Neff | G06T 7/215 348/143 |
| 2008/0056611 | A1 | * | 3/2008 | Mathan | G06K 9/3241 382/284 |
| 2008/0198094 | A1 | * | 8/2008 | Laughlin | G08B 13/19682 345/1.1 |
| 2009/0128399 | A1 | * | 5/2009 | Root, Jr. | F41G 3/04 342/176 |
| 2010/0278425 | A1 | * | 11/2010 | Takemoto | G06T 7/10 382/173 |
| 2012/0089552 | A1 | * | 4/2012 | Chang | G06F 17/30817 706/52 |
| 2013/0021475 | A1 | * | 1/2013 | Canant | H04N 5/33 348/144 |

OTHER PUBLICATIONS

Brian Stevenson et al., "Design and Performance of the Civil Air Patrol ARCHER Hyperspectral Processing System", SPIE, Algorithms and Technologies for Multispectral, Hyperspectral, and Ultraspectral Imagery XI, Proceedings vol. 5806, 2005, pp. 731-742.*

Deepak Khosla, David J. Huber, Rajan Bhattacharyya, Mike Daily, Penn Tasinga, "Neuratty Inspired Rapid Detection of Sparse Objects in videos," Signal Pressing; Sensor Fusion, and Target Recognition XIX, Proc. of SPIE vol. 7697, 76971C, (2010).

Deepak Khosla, Rajan Bhattacharyya, Penn Tasinga, David J. Huber, "Optimal Detection of Objects in Images and Videos Using Electroencephalography (EEG)," Signal Processing, Sensor Fusion, and Target Recognition XX, Proc. of SPIE vol. 8050 80501C-1. (TICR 11-088) (2011).

David J. Huber, Deepak Khosla, "A bio-inspired method and system for visual object-based attention and segmentation," Automatic Target Recognition XX; Acquisition, Tracking, Pointing, and Laser Systems Technologies XXIV; Optical Pattern Recognition XXI, Proc. of SPIE vol. 7696, 769613, (2010).

Deepak Khosla, David J. Huber, "Online, Recursive Estimation of Attention and Salient Regions in Visual Scenes," Automatic Target Recognition XX; Acquisition, Tracking, Pointing, and Laser Systems Technologies XXIV; Optical Pattern Recognition XXI, Proc. of SPIE vol. 7696, 769614, (2010).

David J. Huber, Deepak Khosla, "Bio-inspired "Surprise" for Real-Time Change Detection in Visual Imagery," Automatic Target Recognition XXI, Proc. of SPIE vol. 8049 804904-1 (TICR 11-087) (2011).

Thorpe, S., Fize, D. and Merlot, C., "Speed of processing in the human visual system," Nature 381, 520-522 (1996).

Gerson, A. D., Parra, L. C. and Sajda, P., "Cortically Coupled Computer Vision for Rapid Image Search," IEEE Transactions on Neural Systems and Rehabilitation Engineering 14(2), 174-179 (2006).

M. Isard and J. MacCormick (2001), BraMBLe: A Bayesian Multiple-Blob Tracker. Proc. 8th IEEE International Conference on Comuter Vision (ICCV 2001), 2: 34-41.

J. Shin, S. Kim, S. Kang, S-W. Lee, J. Paik, B. Abidi, and M. Abidi (2005), Optical Flow-Based Real-Time Object Tracking Using Non-Prior Training Active Feature Model. Real-Time Imaging 11(3): 204-218.

M. Isard and A. Blake (1998). Condensation: Conditional Density Propagation for Visual Tracking. International Journal of Computer Vision, 29(1):5-28.

Comaniciu, D., Ramesh, V., & Meer, P. (2000), Real-time tracking of non-rigid objects using mean shift. Proc. IEEE Conference on Computer Vision and Pattern Recognition (CVPR 2000), 2: 142-149.

W.B. DeShetler and J.D. Dillow. (2000), Kalman Filter Tracker. Proc. SPIE 4034, Laser Weapons Technology, 142 (Jul. 21, 2000).

K. Okuma, A. Taleghani, N. de Freitas, J.L. Little, and D.G. Lowe. (2004), A Boosted Particle Filter: Multitarget Detection and Track-

(56) References Cited

OTHER PUBLICATIONS ing, Proc. 8th European Conference on Computer Vision, Prague, Czech Republic (May 11-14, 2004), 28-39.
Reddy, B. S., & Chatterji, B. N. (1996), An FFT-based technique for translation, rotation, and scale-invariant image registration, IEEE transactions on image processing, 5(8):1266-1271.

* cited by examiner

GRAPHICAL DISPLAY AND USER-INTERFACE FOR HIGH-SPEED TRIAGE OF POTENTIAL ITEMS OF INTEREST IN IMAGERY

GOVERNMENT RIGHTS

This invention was made with government support under U.S. Government Contract Number W31P4Q-08-C-0264 CT2WS. The government has certain rights in the invention.

CROSS-REFERENCE TO RELATED APPLICATIONS

This is a non-provisional application of U.S. Provisional Application No. 61/779,320, filed on Mar. 13, 2013, and entitled, "A graphical display and user interface for high-speed triage of potential items of interest in imagery."

BACKGROUND OF THE INVENTION

(1) Field of Invention

The present invention relates to a surveillance system and, more particularly, to a graphical display and user interface system that provides high-speed triage of potential items of interest in imagery.

(2) Description of Related Art

A great deal of interest has been generated in automated surveillance systems that detect anomalies and change in real-time visual imagery. These systems employ a fast and high-detection front end as a first pass that analyzes the entire scene and extracts regions of interest, which are typically advanced to some other system for analysis and/or identification. Due to the importance of the data and the inability for a computer algorithm to replace the judgment of a human being, many of these systems employ a "human in the loop" setup, where the final decision about whether a particular anomaly is a threat falls to a human operator.

While human users might make more accurate interpretations and decisions than a computer algorithm, they simply cannot process raw data as quickly as a computer. Furthermore, human beings become less accurate with their decisions as fatigue sets in. Therefore, the method by which important data is presented to a user is critical; the data presented to the user must be filtered down to only the essential information and presented in a format that is easily interpreted and sufficiently relaxed (not mentally demanding) so that the user can keep up with the real-time processing of the computerized front end and maintain this pace for the entire length of the surveillance task.

An example of a commercially available surveillance system is the Cerberus Scout Surveillance System, produced by MTEQ, Inc., located at 140 Technology Park Drive, Kilmarnock, Va. 22482-3837. The Cerberus system employs a radar-based front-end that feeds into a user interface that controls a camera. The user is notified of possible targets by the radar, and coordinates appear on the user interface. The user can then pan the camera to each detection location and zoom in to inspect it.

The method employed by the prior art is flawed, as it requires a great deal of user interaction. The user must constantly pay attention to the potential targets from the radar and pan and zoom to the location in order to inspect the report. If multiple targets come in at opposite ends of the field of view, it can be difficult for the user to perform a pan-and-zoom to one location, inspect it, and then quickly pan-and-zoom to the next target before it moves out of position. It is likely that the targets could be lost through this process.

Thus, a continuing need exists for a user interface that depicts both targets simultaneously at full resolution and allows the user to instantly determine whether these reports correspond to targets.

SUMMARY OF INVENTION

Described is a system, method, and computer program product for processing imagery. The system, for example, includes one or more processors and a memory. The memory is a non-transitory computer-readable medium having executable instructions encoded thereon, such that upon execution of the instructions, the one or more processors performs several operations, such as receiving at least one image of a scene from a sensor; processing the image to identify a plurality of potential objects of interest (OI) in the image; presenting the potential OI to the user as a series of chips on a threat chip display (TCD), where each chip is a region extracted from the image that corresponds to a potential OI; and allowing the user to designate, via the TCD, any one of the chips as an actual OI.

In another aspect, the potential OI are assigned a confidence score, with the chips arranged on the TCD according to their confidence rank.

In yet another aspect, the chips are tiled on the TCD such that the chip with the highest confidence score is located in an upper left pane.

Additionally, if there are more potential OI chips than can be displayed on a single TCD page, then the chips are arranged into pages that the user can switch between such that the chip with the highest confidence score is located in an upper-left pane of a first TCD page, and chips with lower scores are found on subsequent TCD pages.

Further, in processing the image to identify a plurality of potential OI in the image, a front-end image processing algorithm is used.

In yet another aspect, the system performs an operation of receiving an inhibit command from a user regarding a selected chip, the inhibit command adjusting the front-end image processing algorithm to prevent the front-end algorithm from designating the chip as a potential OI.

In another aspect, each chip is a static image. Alternatively and in another aspect, each chip is a short video clip obtained from either the same location over several frames or the output of a tracking algorithm applied to the potential OI over a series of frames.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
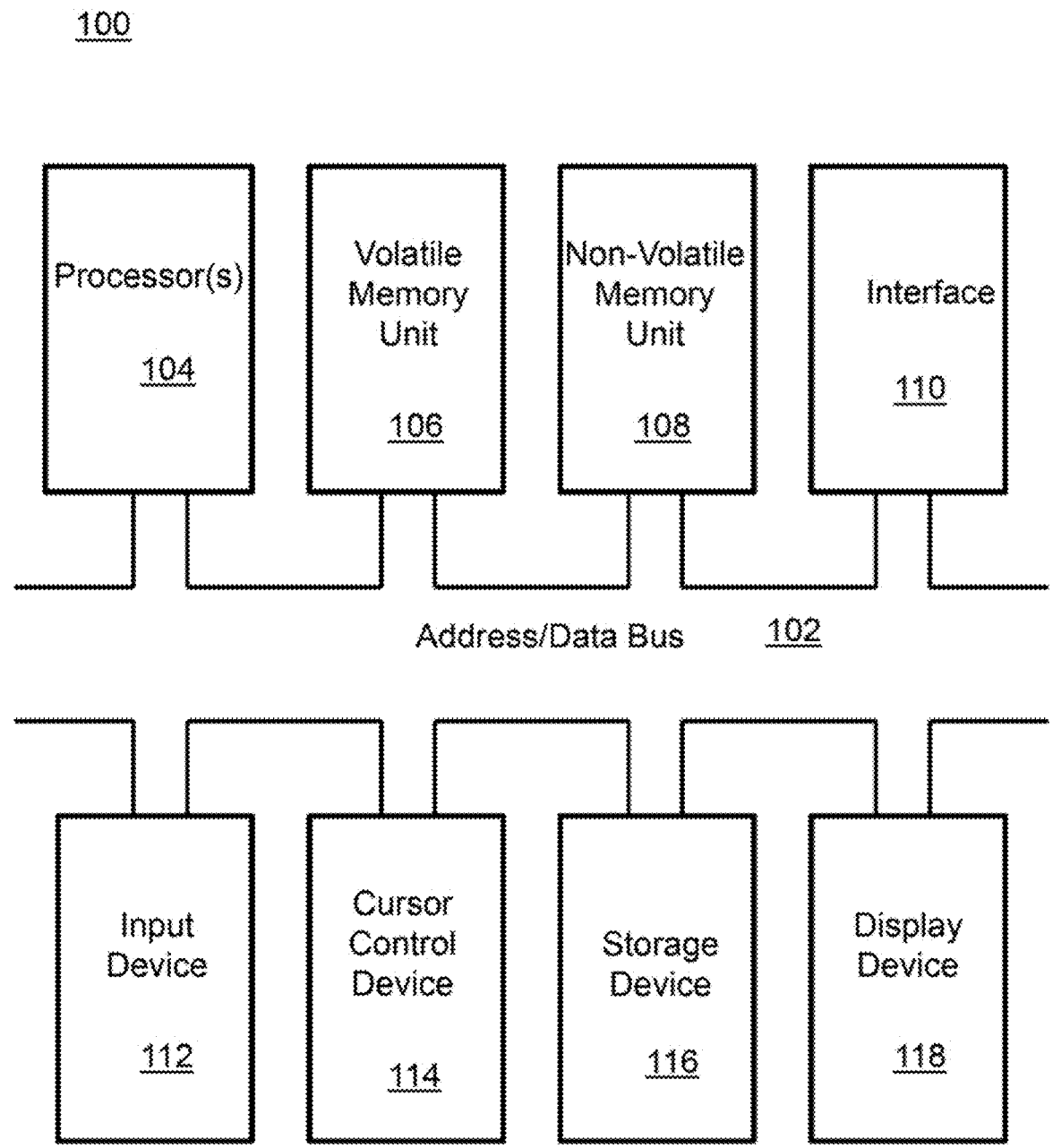
FIG. 1 is a block diagram depicting the components of a system that generates the graphical display and user interface of the present invention.

The present invention provides improved backward diode structures, which may be tailored to a variety of applications. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first description of various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is graphical display and user interface system that is configured to perform all of the operations and processes described herein. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
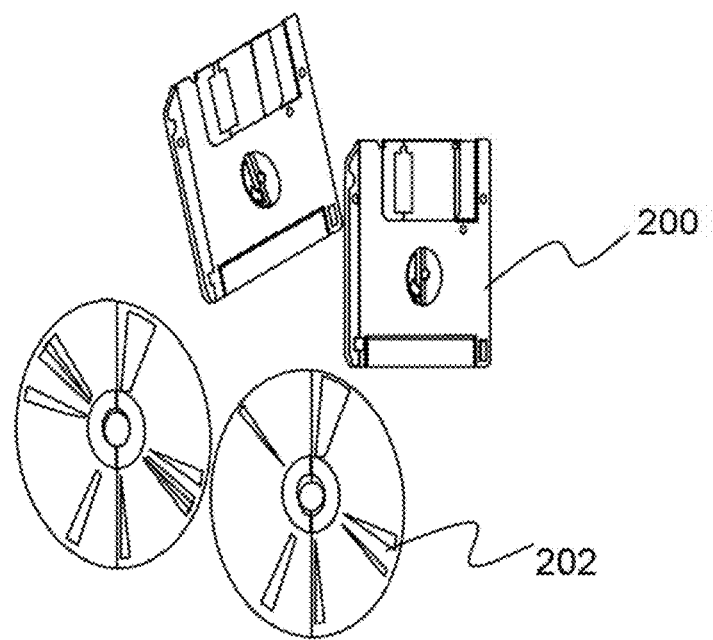
FIG. 2 is an illustration of a computer program produce embodying one aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

(2) Introduction

The present invention is a system that generates and provides a graphical user-interface for high-speed triage of objects of interest (OI) that have been extracted from a video stream by some type of detection algorithm (e.g., saliency, motion detection, or radar). Thus, the system provides a user interface back-end for rapid human-in-the-loop analysis and detection of OI in high-bandwidth imagery and video. OI includes objects, targets and events that the human is interested in detecting and identifying. Typically some front-end detection algorithm (e.g., computer vision, cognitive algorithm, EEG RSVP based detection, radar detection) has been applied to the video and has pre-processed and identified a potential list of OI. The goal of this invention is to facilitate rapid analysis and triaging of this list of potential OI to detect and confirm actual OI by a human user.

The graphical user-interface screen is called the "threat chip display" (TCD) and allows the user to rapidly triage potential targets or OI at their full resolution and perform closer examination of those regions that the user determines as potential targets. The layout of the TCD is designed to be very easy to use with a very low mental demand, which allows the system to be run for extended periods of time.

The TCD consists of a series of tiled videos or still images centered on potential OI and are presented to a user as a series of pages of tiles containing the videos for verification as either a potential target or a false alarm. In operation, the user examines the individual videos and designates those that correspond to targets; the user may also select some of these targets for further examination, which may include viewing the live feed from the region of interest or the full frame at a reduced resolution with all of the potential and actual OI marked on the image. The TCD also allows the user to modulate the behavior of the underlying detection algorithms. For example, in the case of a saliency or surprise algorithm, the user can designate that certain chip behaviors and regions in the image can be inhibited or even completely ignored, allowing the algorithm to behave more effectively.

The TCD displays short video clips of the potential OI at full resolution and allows the user to examine them at that resolution. This is critical since often the full resolution is required to find objects at long distances or those that are partially occluded by the foreground of the scene. By presenting the video clips in full resolution at the expense of the context of the full frame at reduced resolution, the system dramatically reduces the difficulty of the OI triage task by providing an environment in which a user can rapidly triage OI. Using the present invention, it has been shown experimentally that a user can triage up to 50 chips in a 30-second window. Additionally, this rate of 50 chips per 30 seconds can be maintained for many (<=4) hours at a time. This is due to the reduced mental demand that the TCD provides as compared to performing a manual pan-and-zoom of potential OI.

It should be understood that the TCD is a visual software display that is hardware independent and can be run any suitable hardware that includes a display, non-limiting examples of which include an iPad™, generic computer, dashboard of a car, etc. The TCD itself is not a piece of hardware and, instead, is a layout and interface of the display application, which is designed to minimize user fatigue while maximizing user performance (the design is justified based on EEG measurements of stress and workload).

This invention is useful for any application that employs "human-in-the-loop" real-time analysis of results of computer vision algorithms. For example, it is suitable for security applications that require the analysis of massive amounts of video data by a human analyst. Other example applications or areas include surveillance, autonomous systems, intelligence analysis, etc. Further, if an additional tracking algorithm was used on the detections, the user would also be able to watch the targets in real-time from a live feed.

(3) Specific Aspects of the Invention (3.1) Threat Chip Display

As noted above, the present invention is directed to a Threat Chip Display (TCD) system that allows for high-speed triage of potential OI. The TCD system includes of a graphical user interface (GUI) and a series of optional subsystems that can be implemented when the user determines that a given item in the TCD requires further inspection. The purpose of the TCD is to present the user with the most important information initially for rapid analysis, while providing the option of closer analysis should the user determine its necessity. This increases the speed at which the user can detect targets, reduces the video bandwidth required by the GUI, and minimizes user fatigue.

The threat chip display (TCD) system is a graphical back-end to an image processing task performed on video imagery. Prior to introduction to the TCD, a front-end algorithm detects and extracts the potential OI. For example, an image processing unit can be included to parse a high-definition, high-bandwidth video feed and extract anomalies that can be further analyzed by the user using the TCD. The front-end image processing task can be one of any number of detection/triage algorithms, non-limiting examples of which include saliency/surprise and motion detection. Another example of front-end image processing is a radar that takes an entire video sequence as input and outputs locations and confidence scores of possible candidate items of interest (potential OI). Ideally, this processing involves the calculation of confidence scores for each potential OI. This effectively filters the data from the sensors to a quantity that a human can manage. Additional post-processing can be applied to the potential OI scores via algorithms such as RSVP/EEG or object recognition after the appropriate image regions have been extracted from the video data. A non-limiting example of RSVP/EEG was described by Thorpe, S., Fize, D. and Merlot, C., in "Speed of processing in the human visual system," Nature 381, 520-522 (1996) and Gerson, A. D., Parra, L. C. and Sajda, P., in "Cortically Coupled Computer Vision for Rapid Image Search," IEEE Transactions on Neural Systems and Rehabilitation Engineering 14(2), 174-179 (2006), both of which are hereby incorporated by reference as though fully set forth herein. The Thorpe et al. and Gerson et al. references describe a process by which the candidate items of interest are displayed to the user at a high speed using the RSVP paradigm and the confidence that a given item of interest is a target is inferred from the user's EEG response.

Figure 3A:
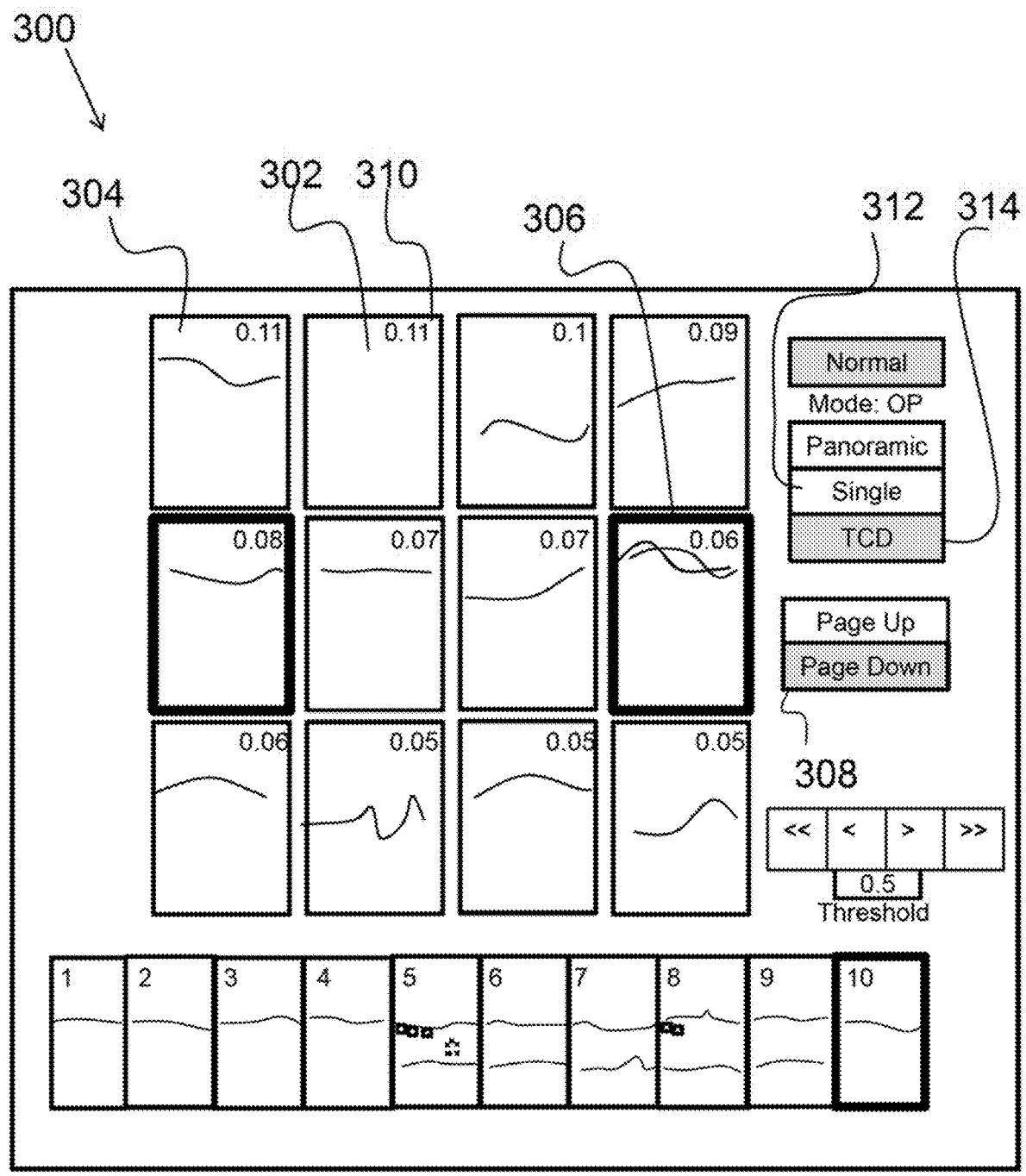
FIG. 3A is an example of a graphical user-interface screen referred to as a threat chip display (TCD)

After the front-end image processing unit performs the desired image processing task to detect the potential OI, the potential OI are presented to a user in the TCD. An example of a TCD (interface screen) is illustrated in FIG. 3A. The TCD 300 includes series of "chips" 302, which are full-resolution regions extracted from the full frame video that correspond to potential OI. Each "chip" 302 can be a static image or a short video clip obtained from either the same location over several frames or the output of a tracking algorithm applied to the potential OI over a series of frames. If there are more potential OI chips 302 than can be displayed on the screen at full resolution, then the chips are arranged into "pages" that the user can switch between. The chips 302 are tiled on each page and arranged in any desired manner. As a non-limiting example, the chips 302 are arranged according to their confidence rank so that the highest chip is located in the upper-left pane 304 of the frame of the first page, and chips with lower scores are found on subsequent pages. The user can select individual chips with some type of input device (e.g., mouse/keyboard, gamepad, eye tracking, etc.) and can mark individual chips with some sort of feedback (e.g., "this is a target"). The feedback status of the chip is indicated using any suitable indicia. As a non-limiting example, the feedback status is indicated by either a colored border 306 or text superimposed on the chip in the display 300. A page selector 308 is provided that allows a user to switch to the next or previous page using the same input device. This layout is intended to allow the user to rapidly triage the results of the algorithm in full-resolution and make decisions about whether to disregard the potential OI in a given chip or take further action.

The only actions that a user has to take to designate a potential OI as an actual OI is to select the chip and click the appropriate button or key that corresponds to "target". As a non-limiting example, the user can label chips as actual OI by simply clicking directly on the chip, which turns its border red (or otherwise provides some other user understood indicia).

The user can also use the TCD 300 to adjust the behavior of the front-end image processing algorithms. In the example depicted in FIG. 3A, the user has elected to inhibit the chip in the upper-left (denoted by a downward pointing arrow). For example, in initially processing the imagery, the front-end imaging processing algorithm will not designate the upper-left as a potential OI, regardless of the confidence score.

The confidence score 310 for each potential OI is indicated in the upper-right corner of each chip 302 in the TCD 300. If the detection front-end begins to return too many false alarms with low scores, filling up many pages, the user can affect which potential OI are displayed using a simple threshold function. By increasing the minimum threshold for display, the system will only display potential OI chips whose confidence score 310 exceeds the desired threshold. This can reduce the user's workload. It was found experimentally that a user can scan through about 50 chips in 30 seconds if they are properly ranked and the scenario is not too target rich (<20% targets).

Another section of the TCD 300 generally contains some simple controls (buttons, etc.) that allow the user to access additional inspection options for individual chips (single mode 312) or groups of chips (TCD mode 314). This control panel also contains the buttons for transitioning between pages (e.g., 308) in the display and any other desired control.

Figure 3B:
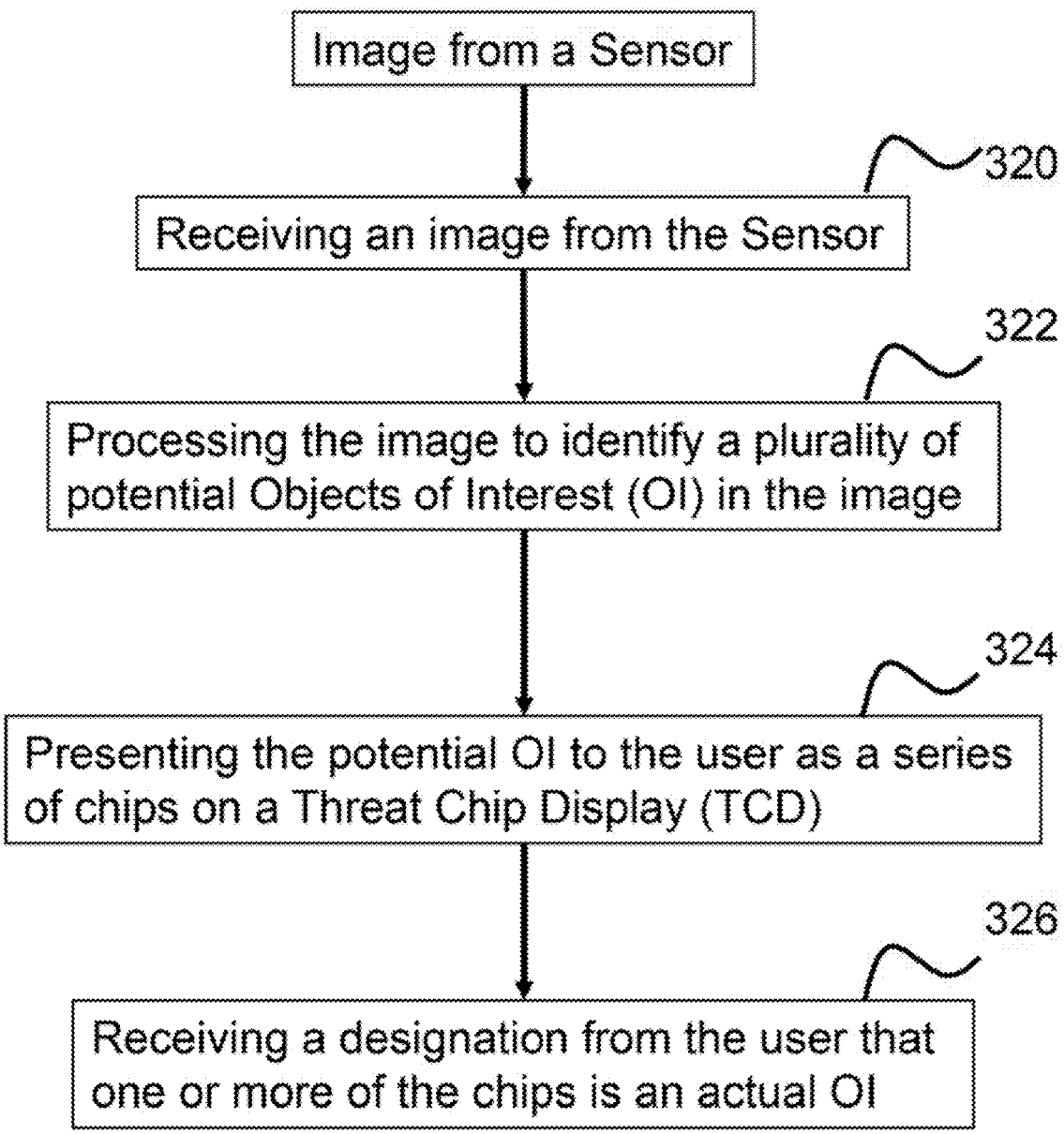
FIG. 3B is a flow chart depicting a processing for processing and presenting a potential object of interest via the TCD.

As a brief summary of the TCD and as shown in FIG. 3B, the system receives 320 at least one image of a scene from a sensor. The image is processed 322 to identify a plurality of potential objects of interest (OI) in the image. The potential OI is presented 324 to the user as a series of chips on a threat chip display (TCD), where each chip is a region extracted from the image that corresponds to a potential OI. Thus, using the TCD, the user is allowed to designate 326 any one of the chips as an actual OI.

(3.2) User Interaction with the TCD

In addition to being able to designate a potential OI as a "target", the TCD 300 supports a wide range of options for user control and examination of chips 302. This provides the user with additional options if he is unable to determine the nature of a given chip from the simple video supplied. It should be noted that the user can control the TCD 300 using any suitable control device, such as a game pad or other control device.

Figure 4:
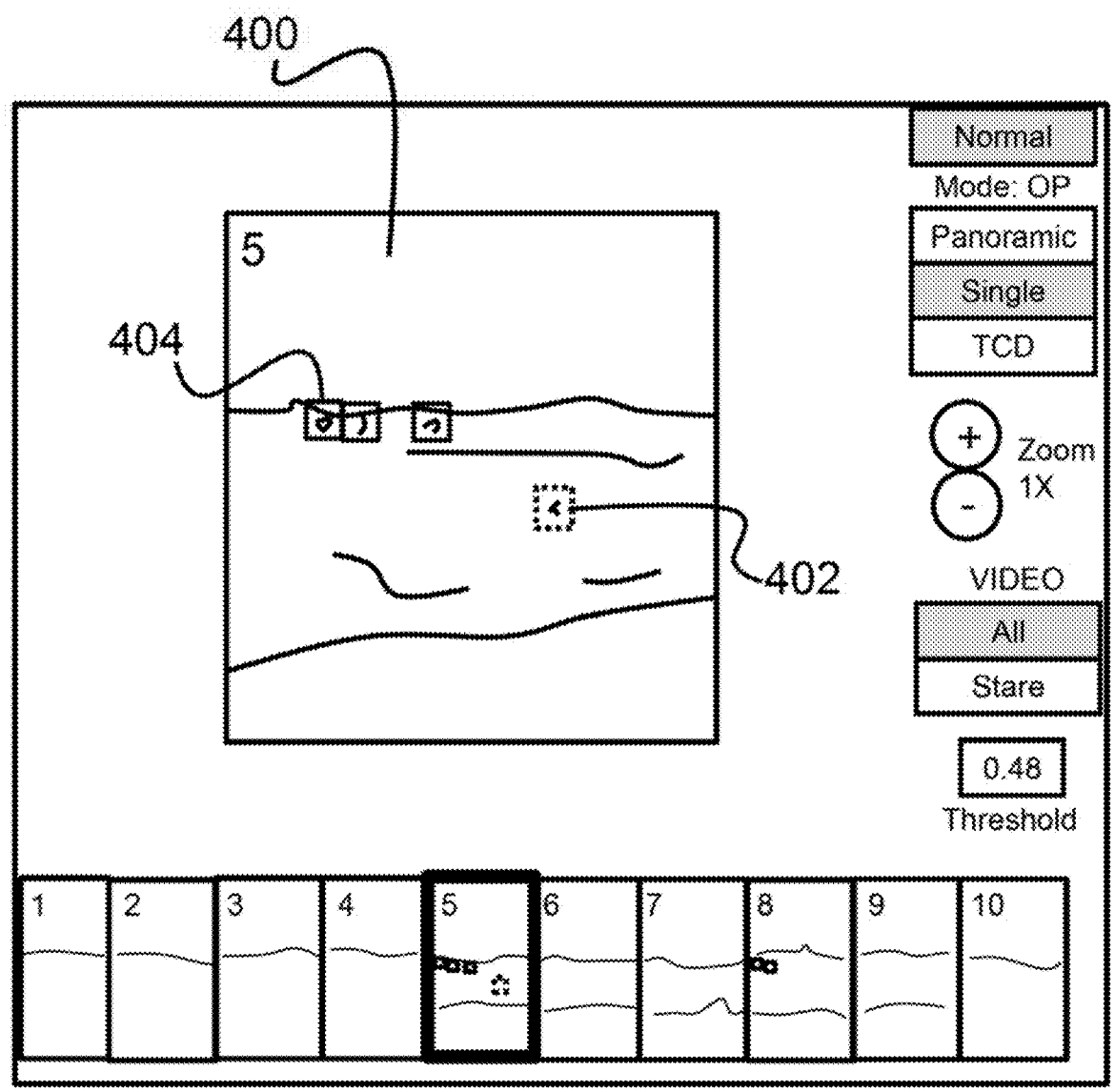
FIG. 4 is an example of full-fame graphical user interface in which the TCD is superimposed over an image of a scene.

At times, the user may require the context of the entire frame to determine whether a given potential OI is a target. As shown in the full-frame mode as depicted in FIG. 4, this can be done from the TCD by switching to a reduced resolution full-frame view 400 with the location of the chip (and other potential and actual OI) superimposed on the image as an outline. In this non-limiting example, potential OI 402 are indicated by the dashed lines while actual OI 404 are indicated in solid lines. In this case, the user has chosen to view the potential OI 1402 in context with the rest of the frame. A reduced resolution version of the field of view 400 is displayed to the user with the OI indicated. The potential 402 and actual OI 404 can be colored differently for easy identification. For example, the actual OI 404 can be indicated by red box while the potential OI 402 can be indicated with a yellow box. In this mode, the user can pan and zoom in the reduced resolution image and inspect potential threats, much like the "traditional" approach. This simulates the act of looking through a pair of binoculars and is useful when the user requires some type of environmental context for the potential OI 402 chip to determine whether it is a target or not. When the user is finished, the original TCD can be restored with a button press.

Additionally, the user may switch any chip between the recorded video and a live feed. Since each video clip might be as old as the refresh rate of the TCD (e.g., thirty seconds), the user might find it useful to be able to look at a live video feed for that region of the image. This can provide the user with more frames of video to examine the chip, which can be useful in separating rhythmic or periodic patterns and motions from those that are more aberrant.

Additionally, the system can be formed to include a tracking algorithm on its front end. Non-limiting examples of a suitable tracking algorithm includes a blob-tracker, optical flow-tracking, contour-tracking, and kernel-based methods; the use of Kalman filters or Particle filters; or feature-matching across frames of video.

An example of a blob-tracker was described by M. Isard and J. MacCormick in "BraMBLe: A Bayesian Multiple-Blob Tracker," *Proc. 8th IEEE International Conference on Computer Vision (ICCV* 2001). 2: 34-41 (2001), while an example of optical-flow tracking was described by J. Shin, S. Kim, S. Kang, S-W. Lee, J. Paik, B. Abidi, and M. Abidi in "Optical Flow-Based Real-Time Object Tracking Using Non-Prior Training Active Feature Model" *Real-Time Imaging* 11(3): 204-218 (2005). An example of contour-tracking was described by M. Isard and A. Blake in "CONDENSATION: Conditional Density Propagation for Visual Tracking," *International Journal of Computer Vision*. 29(1):5-28 (1998), while an example of kernel-based methods was described by Comaniciu, D., Ramesh, V., & Meer, P. in "Real-time tracking of non-rigid objects using mean shift," *Proc. IEEE Conference on Computer Vision and Pattern Recognition (CVPR* 2000). 2:142-149 (2000). An example of Kalman filter tracking was described by W. B. DeShetler and J. D. Dillow in "Kalman Filter Tracker," *Proc. SPIE* 4034, *Laser Weapons Technology*, 142 (Jul. 21, 2000), while an example of particle filters was described by K. Okuma, A. Taleghani, N. de Freitas, J. L. Little, and D. G. Lowe in "A Boosted Particle Filter: Multitarget Detection and Tracking," *Proc. 8th European Conference on Computer Vision*, Prague, Czech Republic (May 11-14, 2004). 28-39. Finally, an example of feature-matching across frames of video was described by Reddy, B. S., & Chatterji. B. N. in "An FFT-based technique for translation, rotation, and scale-invariant image registration," *IEEE transactions on image processing*, 5(8):1266-1271 (1996). It should be noted that all of the aforementioned references are hereby incorporated by reference as though fully set forth herein.

In other words and as evident above, a tracker can be placed on each potential OI as they are detected, which allows the user view a live video feed of the track for the potential OI. This is particularly useful, for example, when the user recognizes a vehicle or dismount in a chip and wishes to determine its current location.

Finally, the underlying front-end detection algorithms can be completely modulated by the user via the TCD. For example, a user could elect to inhibit chips that do not correspond to targets, but rather were selected because of some distracter, such as a tree blowing in the wind. This feedback can be sent back to the front-end system and integrated into the determination of future potential OI. If the system returns a potential OI that is close to the camera or corresponds entirely to foreground, such as a giant rock in the scene close to the camera, the user may elect to "ignore" that chip. Ignoring the chip sends a message to the detection algorithm to not process that spatial location in the video, and future TCDs will not include instances of that location.

(3.3) Advantages of the TCD

In addition to providing a "chip-centric" approach to examining potential OI, the TCD interface also provides a series of technical improvements to standard surveillance GUI design. For example, the TCD interface has been designed to be implementable on any platform, including those with data bandwidth limitations or tasks where the user must examine data for a long time.

A particular advantage of the TCD is that it sends a minimal amount of information from the processing computers to the TCD computer. This is especially useful on remote, moving platforms such as an unmanned aerial vehicle (UAV), where the user is stationed at a remote location, but can also benefit a wired connection if the sensor bandwidth exceeds what can be sent from the processing computer to the TCD computer. The TCD only requires the full resolution version of the chips for each block; the rest of the image data is only required if the user requests it for further analysis.

This system also reduces the operator load through its method of reporting results. In a target-rich environment, the system can report only those anomalies that have been positively identified as a predetermined threat class that score above a certain threshold. In a target-poor environment, the user may elect to lower this threshold to view more potential threats, or can choose to view all possible threats. In any case, threats are displayed on the user's console in a minimalist "chip" notation, which allows fast threat assessment and minimal user workload over the wide field-of-view (WFOV) imagery.

Additionally, the system is designed to require very low communications bandwidth between the user and the sensor/ processor, which makes it ideal for situations in which the user is far from the sensor/processor or where the amount of data handled by the camera is large enough that it would saturate a normal communications channel (e.g., wireless) were all video imagery sent from the sensor to the user. The chip system can also be implemented in either software or hardware.

A "standard" user interface, in which the user is given locations of potential OI and then has to manually pan and zoom the camera to view them at full resolution requires constant user attention. Conversely, the TCD is designed to be very easy to use and have a very low user workload. The simplified display and lack of complicated user input presents the user with a simple binary task of deciding whether a given potential OI is a target or not, and is toggled with a mouse or controller click. This allows the TCD to be used for long periods of time without exhausting the user. An additional benefit of the TCD system is that its tasks can be easily partitioned between multiple users; one user may label potential OI as targets or non-targets, providing a high-throughput filtering stage, while the second user can perform more complicated tasks on the much smaller population of target chips, such as viewing live or looking at their context within the full-frame at reduced resolution. Finally, even if the TCD system is operated by a single user, the labeling of chips as targets is a singular task, as opposed to a multi-step task (i.e., pan to potential OI, zoom in, decide, zoom out, pan to next OI, etc.), which dramatically reduces the mental workload on the user.

What is claimed is:

1. A computer program product for processing imagery, the computer program product comprising:
 a non-transitory computer-readable medium having executable instructions encoded thereon, such that upon execution of the instructions by one or more processors, the one or more processors perform operations of:
  receiving at least one image of a scene in a visible spectrum from a sensor;
  processing the at least one image to identify a plurality of potential objects of interest (OI) in the at least one image based on saliency or motion of the plurality of potential OI;
  assigning a confidence score to each of the plurality of potential OI by displaying the plurality of potential OI to a user at a high seed using raid serial visual presentation (RSVP) while measuring the user's electroencephalographic (EEG) response to the RSVP, with the confidence scores being based on the user's EEG response to the RSVP;
  altering, based on user selection, a minimum confidence score threshold for the plurality of potential OI;
  presenting a full frame of the at least one image of the scene at a reduced resolution, the full frame having a location of the plurality of potential OI superimposed over the full frame such that the plurality of potential OI remain at the reduced resolution within the full frame;
  presenting a plurality of potential OI that exceed the minimum confidence score as a series of chips on a threat chip display (TCD), the chips being presented at full resolution, where each chip is a region extracted from the at least one image that corresponds to a potential OI; and
  designating, via the TCD, any one of the chips as an actual OI.

2. The computer program product as set forth in claim 1, wherein the chips are arranged on the TCD according to their confidence score.

3. The computer program product as set forth in claim 2, wherein the chips are tiled on the TCD such that the chip with the highest confidence score is located in an upper left pane.

4. The computer program product as set forth in claim 3, wherein if there are more potential OI chips than can be displayed on a single TCD page, then the chips are arranged into pages that a user can switch between such that the chip with the highest confidence score is located in an upper-left pane of a first TCD page, and chips with lower scores are found on subsequent TCD pages.

5. The computer program product as set forth in claim 4, wherein in processing the at least one image to identify a plurality of potential OI in the at least one image, a front-end image processing algorithm is used.

6. The computer program product as set forth in claim 5, further comprising instructions for causing the one or more processors to perform an operation of receiving an inhibit command from a user regarding a selected chip, the inhibit command adjusting the front-end image processing algorithm to prevent the front-end algorithm from designating the selected chip as a potential OI.

7. The computer program product as set forth in claim 6, wherein each chip is a static image.

8. The computer program product as set forth in claim 6, wherein each chip is a short video clip obtained from either the same location over several frames or the output of a tracking algorithm applied to the potential OI over a series of frames.

9. The computer program product as set forth in claim 1, further comprising instructions for causing the one or more processors to perform an operation of switching a chip, based on user selection, between a recorded video and a live feed.

10. The computer program product as set forth in claim 1, further comprising instructions for causing the one or more processors to perform an operation of switching, based on user selection, between the full frame with the reduced resolution and the TCD having chips presented at full resolution.

11. The computer program product as set forth in claim 1, further comprising instructions for causing the one or more processors to perform an operation of altering, based on user selection, a threat class threshold to increase or decrease a number of chips being displayed in the TCD.

12. The computer program product as set forth in claim 1, wherein in processing the at least one image to identify a plurality of potential OI in the at least one image, a front-end image processing algorithm is used, and further comprising instructions for causing the one or more processors to perform an operation of receiving an ignore command from a user regarding a potential OI that corresponds to a foreground object, the ignore command causing the front-end image processing algorithm to avoid processing a spatial location in the at least one image associated with the foreground object such that future TCDs exclude instances of the spatial location.

13. A system for processing imagery, the system comprising:
 one or more processors and a memory, the memory being a non-transitory computer-readable medium having executable instructions encoded thereon, such that upon execution of the instructions, the one or more processors perform operations of:

receiving at least one image of a scene in a visible spectrum from a sensor;

processing the at least one image to identify a plurality of potential objects of interest (OI) in the at least one image based on saliency or motion of the plurality of potential OI;

assigning a confidence score to each of the plurality of potential OI by displaying the plurality of potential OI to a user at a high seed using rapid serial visual presentation (RSVP) while measuring the user's a electroencephalographic (EEG) response to the RSVP, with the confidence scores being based on the user's EEG response to the RSVP;

a altering, based on user selection, a minimum confidence score threshold for the plurality of potential OI;

presenting a full frame of the at least one image of the scene at a reduced resolution, the full frame having a location of the plurality of potential OI superimposed over the full frame such that the plurality of potential OI remain at the reduced resolution within the full frame;

presenting a plurality of potential OI that exceed the minimum confidence score as a series of chips on a threat chip display (TCD), the chips being presented at full resolution, where each chip is a region extracted from the at least one image that corresponds to a potential OI; and designating, via the TCD, any one of the chips as an actual OI.

14. The system as set forth in claim 13, wherein the chips arranged on the TCD according to their confidence score.

15. The system as set forth in claim 14, wherein the chips are tiled on the TCD such that the chip with the highest confidence score is located in an upper left pane.

16. The system as set forth in claim 15, wherein if there are more potential OI chips than can be displayed on a single TCD page, then the chips are arranged into pages that a user can switch between such that the chip with the highest confidence score is located in an upper-left pane of a first TCD page, and chips with lower scores are found on subsequent TCD pages.

17. The system as set forth in claim 16, wherein in processing the at least one image to identify a plurality of potential OI in the at least one image, a front-end image processing algorithm is used.

18. The system as set forth in claim 17, further comprising instructions for causing the one or more processors to perform an operation of receiving an inhibit command from a user regarding a selected chip, the inhibit command adjusting the front-end image processing algorithm to prevent the front-end algorithm from designating the selected chip as a potential OI.

19. The system as set forth in claim 18, wherein each chip is a static image.

20. The system as set forth in claim 18, wherein each chip is a short video clip obtained from either the same location over several frames or the output of a tracking algorithm applied to the potential OI over a series of frames.

21. The system as set forth in claim 14, wherein presenting the series of chips on a threat chip display replaces the full frame of the at least one image of the scene at a reduced resolution.

22. The system as set forth in claim 14, further comprising an operation of switching a chip between a live feed of the location and a recorded video of the location.

23. The system as set forth in claim 13, wherein in processing the at least one image to identify a plurality of potential OI in the at least one image, a front-end image processing algorithm is used, and further comprising instructions for causing the one or more processors to perform an operation of receiving an ignore command from a user regarding a potential OI that corresponds to a foreground object, the ignore command causing the front-end image processing algorithm to avoid processing a spatial location in the at least one image associated with the foreground object such that future TCDs exclude instances of the spatial location.

24. A computer implemented method for processing imagery, the method comprising an act of:

causing one or more processors to execute instructions encoded on a non-transitory computer-readable medium, such that upon execution, the one or more processors perform operations of:

receiving at least one image of a scene in a visible spectrum from a sensor;

processing the at least one image to identify a plurality of potential objects of interest (OI) in the at least one image based on saliency or motion of the plurality of potential OI;

assigning a confidence score to each of the plurality of potential OI by displaying the plurality of potential OI to a user at a high speed using rapid serial visual presentation (RSVP) while measuring the user's electroencephalographic (EEG) response to the RSVP, with the confidence scores being based on the user's EEG response to the RSVP;

altering, based on user selection, a minimum confidence score threshold for the plurality of potential OI;

presenting a full frame of the at least one image of the scene at a reduced resolution, the full frame having a location of the plurality of potential OI superimposed over the full frame such that the plurality of potential OI remain at the reduced resolution within the full frame;

presenting a plurality of potential OI that exceed the minimum confidence score as a series of chips on a threat chip display (TCD), the chips being presented at full resolution, where each chip is a region extracted from the at least one image that corresponds to a potential OI; and designating, via the TCD, any one of the chips as an actual OI.

25. The method as set forth in claim 24, wherein the chip are arranged on the TCD according to their confidence score.

26. The method as set forth in claim 25, wherein the chips are tiled on the TCD such that the chip with the highest confidence score is located in an upper left pane.

27. The method as set forth in claim 26, wherein if there are more potential OI chips than can be displayed on a single TCD page, then the chips are arranged into pages that a user can switch between such that the chip with the highest confidence score is located in an upper-left pane of a first TCD page, and chips with lower scores are found on subsequent TCD pages.

28. The method as set forth in claim 27, wherein in processing the at least one image to identify a plurality of potential OI in the at least one image, a front-end image processing algorithm is used.

29. The method as set forth in claim 28, further comprising operations of receiving an inhibit command from a user regarding a selected chip, the inhibit command adjusting the front-end image processing algorithm to prevent the front-end algorithm from designating the selected chip as a potential OI.

30. The method as set forth in claim 29, wherein each chip is a static image.

31. The method as set forth in claim 29, wherein each chip is a short video clip obtained from either the same location over several frames or the output of a tracking algorithm applied to the potential OI over a series of frames.

32. The method as set forth in claim 24, wherein in processing the at least one image to identify a plurality of potential OI in the at least one image, a front-end image processing algorithm is used, and further comprising an operation of causing the one or more processors to perform an operation of receiving an ignore command from a user regarding a potential OI that corresponds to a foreground object, the ignore command causing the front-end image processing algorithm to avoid processing a spatial location in the at least one image associated with the foreground object such that future TCDs exclude instances of the spatial location.

\* \* \* \* \*